Dec. 3, 1940.　　　G. HEGWEIN　　　2,224,101
WATER SOFTENING DEVICE
Filed March 11, 1938　　　2 Sheets-Sheet 1
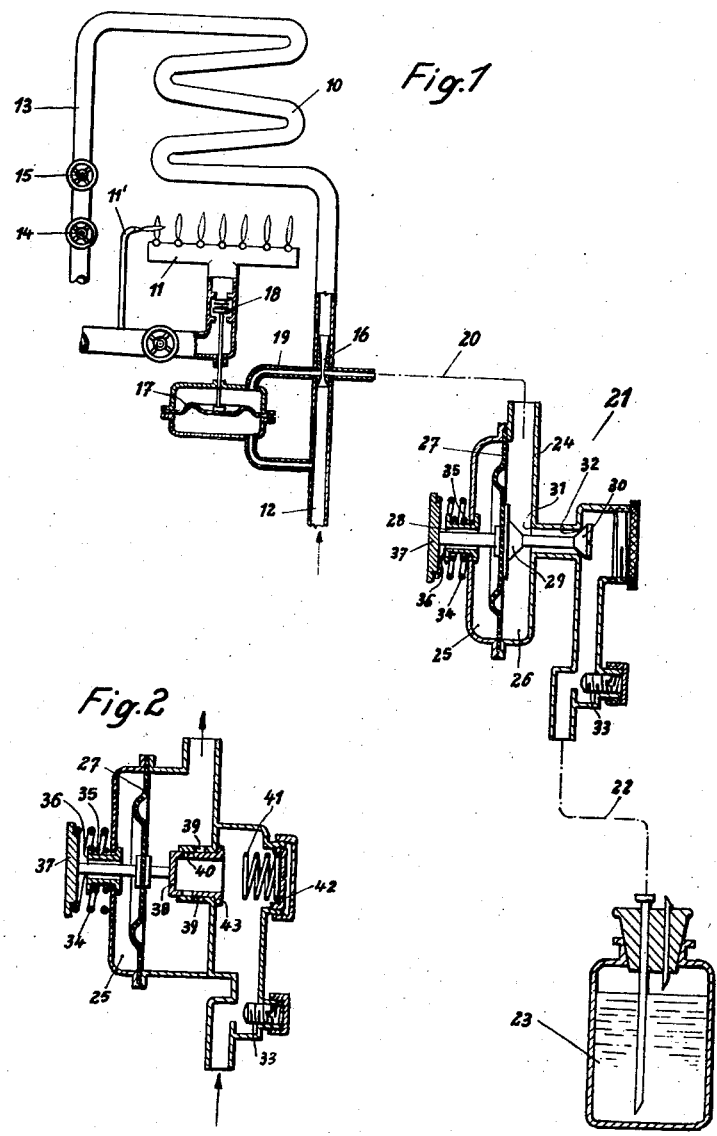

Dec. 3, 1940.  G. HEGWEIN  2,224,101
WATER SOFTENING DEVICE
Filed March 11, 1938  2 Sheets-Sheet 2
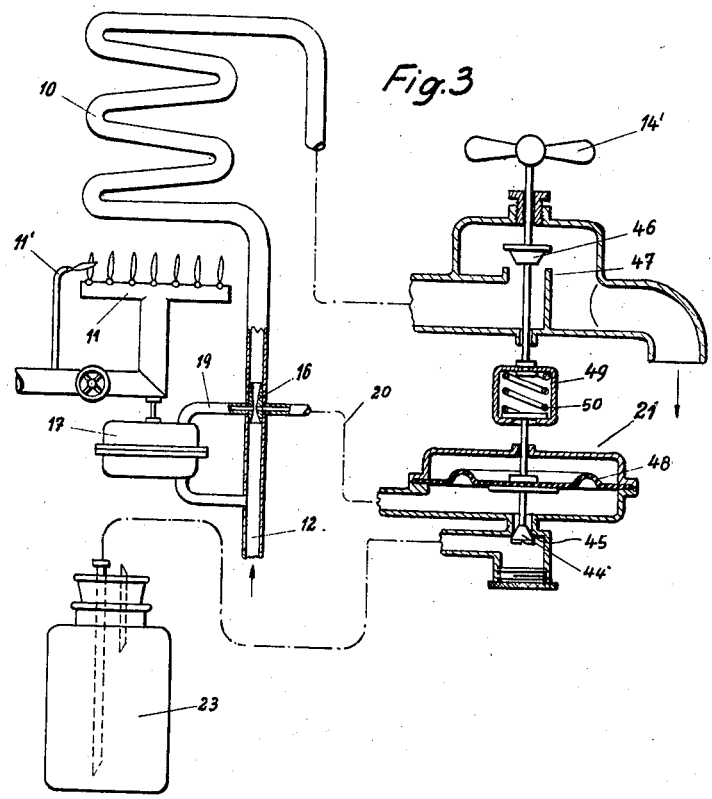
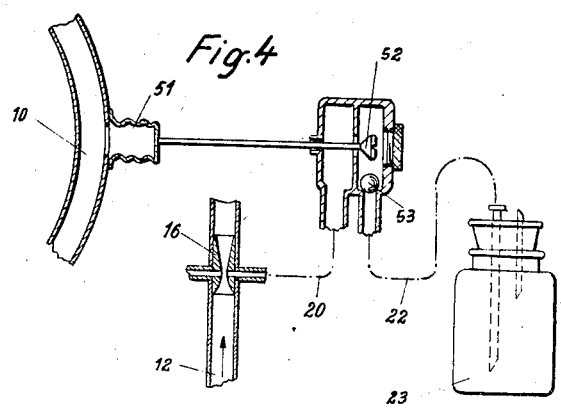

Patented Dec. 3, 1940

2,224,101

UNITED STATES PATENT OFFICE 2,224,101

WATER SOFTENING DEVICE

Georg Hegwein, Dessau, Germany, assignor to Junkers & Co. G. m. b. H., Dessau, Germany Application March 11, 1938, Serial No. 195,399
In Germany March 16, 1937

10 Claims. (Cl. 210—31)

This invention relates to water softening devices adapted to be used in combination with continuous flow heaters or other apparatus.

To ensure the satisfactory working of apparatus such as boilers, storage tanks, continuous flow heaters and the like for heating liquids in which water is raised to a high temperature (for example over 60° C.) it is necessary that the water to be heated should, especially if it exhibits a high degree of hardness, be given an addition of chemicals (so-called 'softeners') which prevent the deposition of boiler fur on the surfaces of the heater which are in contact with the water. Alternatively the heater must be freed, at intervals from incrustations of boiler fur by means of special solvents. Thus for example numerous devices have already been evolved for purifying boiler-feed water which soften the feed water prior to its admission into the boiler. In this connection it is known to utilise the energy of flow of the incoming water for drawing the softening agent into the water by means of injectors, Venturi tubes or the like. In like manner it has also been proposed that the Venturi tubes employed for generating the pressure drop for automatically opening and closing the gas valves of gas-heated continuous-flow heaters should also be utilised for drawing in a boiler-fur solvent (such as hydrochloric acid) to be mixed with the water in order to re-dissolve the boiler fur deposited in the heater.

The present invention relates to a water-softening device which is suitable, in particular for continuous-flow heaters, intended to furnish boiling, hot, or warm water as may be required. In the case of such heaters a larger or smaller amount of water is allowed to flow through the heater according to whether a higher or lower temperature at the outlet is desired. The amount of flow can be controlled by means of a draw-off cock or a special control device. Since the suction effect of an injector or the like located in the path of the flowing water increases and diminishes with the amount of water passing through only a small amount of the softening agent would be drawn in when boiling water was drawn off, and a larger amount of said agent in the case of warm water if the suction pipe for the softening agent were connected with an injector or Venturi tube without any special means of control. It is, however, desirable that the amount of softening agent introduced should be in inverse proportion to the amount, and the outlet temperature, of water passing through the heater, because the higher said temperature, the greater the tendency for the deposition of boiler fur by the water. On the other hand no softening agent is needed when the water is heated only to about 40° C., because in that case the formation of boiler fur is quite insignificant. So long as no water is being drawn off the path from the heater to the storage vessel for the softening agent should be closed in order to prevent the water standing under pressure in the heater from being forced into said storage vessel. It is also desirable to provide means for automatically closing the passage to the storage vessel in the event of the outlet from the heater becoming wholly or partially obstructed, for example by impurities in the water, or by boiler-fur incrustation, in order that the pressure generated in the heater while in operation may not force the water into the storage vessel for the softening agent.

According to the present invention a device fulfilling the said requirements for controlling the amount of softening agent supplied to the water and protecting the storage vessel for said agent from being penetrated by water, is furnished by locating in the suction pipe leading from the suction device to said storage vessel, a control valve which automatically regulates and shuts off the supply of the softening agent in accordance with the amount of water drawn off. Said control valve is preferably actuated by an adjusting member (diaphragm, piston or the like) which is subjected to the action of the pressure in the suction pipe attached to the suction device (Venturi tube, injector or the like). The control valve may, however, also be controlled in accordance with the temperature of the heated water at a predetermined point in the heater or it may be operatively coupled with the device regulating the flow of water through the heater. The control valve may be of the double-cone or sliding-piston type which when in the neutral position, determined for example by the spring-loading of the adjusting device, shuts off the passage for the softening agent but opens it fully when boiling water is drawn off whilst again throttling said passage as the flow of water through the heater increases and shuts it off completely when a certain maximum flow of water is exceeded, or when the withdrawal of water ceases. According to the invention in order to limit with precision the control movements of the adjusting member under the varying action of the suction device several springs (of equal or different tension) which come successively into operation are employed for loading the adjusting member. The control valve may also be so designed as to supply the water in the heater with the same amount of softening agent per litre when "boiling" or "hot" water is to be drawn off.

Several typical embodiments of the present invention are illustrated in the accompanying drawings in which:

Fig. 1 represents a gas-heated liquid heater with an automatic diaphragm gas valve, a control valve attached to the Venturi tube and actuated by the pressure in the suction pipe, and a storage vessel for the softening agent.

Fig. 2 shows another typical embodiment of a control valve actuated by the pressure in the suction pipe.

Fig. 3 shows an embodiment in which the control valve in the suction pipe for the softening agent is operatively connected with the draw-off cock, whilst in the embodiment shown in Fig. 4, the control valve is actuated by a thermo-sensitive device which responds to the temperature of the water at a suitable point of the heater.

As shown in Fig. 1, 10 denotes the coiled-tube water pipe and 11 the gas burner of the heater. The cold water enters the heater through the pipe 12 and is drawn off through the pipe 13. 14 is the draw-off cock and 15 a device by means of which the amount of water flowing through the heater per unit of time, and therefore the desired discharge temperature, can be adjusted. The cold water flows through a Venturi tube 16. The suction generated by the Venturi tube at its point of minimum cross section serves to actuate the diaphragm 17 controlling the gas valve 18 through a suction pipe 19. In addition to the suction pipe 19 there is attached at the point of minimum cross section of the Venturi tube 16 another pipe 20 which leads to the control valve 21. The pipe 22 connects the control valve with the storage vessel 23 for the softening agent.

The control valve 21 comprises a casing 24 provided with connecting branches for the pipes 20 and 22 leading respectively to the Venturi tube and the storage vessel. The casing 24 contains two chambers 25, 26 separated by a diaphragm 27 serving as adjusting member. The chamber 25 communicates with the atmosphere through an orifice 28, and the other chamber 26 communicates with the suction pipe 20. Suspended on the diaphragm 27 is a valve having cones 29, 30 which control the two valve seatings 31, 32. The branch of the casing 24 connecting the pipe 22 is also provided with a screw throttle 33. In the neutral position a loading spring 34 presses the valve cone 30 against its seating 32. Coaxially with the spring 34 is another loading spring 35, guided on a sleeve 36. This spring comes into operation only after the diaphragm 27 has described a predetermined stroke.

The device functions in the following manner: To enable water to be drawn off at a predetermined temperature the adjusting device 15 is first adjusted, for example for drawing off "boiling" water. The draw-off cock is then turned on. The cold water flows through the pipe 12 and Venturi tube 15 to the heater. The suction created by the Venturi tube acts through the pipe 19 on the diaphragm 17 which is lifted and opens the gas valve 18. The gas issuing from the burner 11 is ignited by the pilot flame 11' and heats the water passing through the coil 10. The Venturi tube also creates a suction effect in the pipe 20, the result being that the diaphragm 27 is moved slightly towards the right, against the force of the spring 34, and slightly opens the attached valve 30 which was hitherto pressed against its seating 32 so that the pipe 22 and the storage vessel 23 are under suction. In this way a predetermined amount of the softening agent is drawn past the cone 30 and is continuously mixed with the water flowing to the heater. In order to limit the stroke of the valve 29, 30 with precision a second loading spring 35, guided on the sleeve 36, is located inside the loading spring 34. When the diaphragm 27 has described the lifting stroke (e. g. 1–2 mm. according to the dimensions of the entire control device) needed for the withdrawal of boiling water the spring abutment plate 37, mounted on the diaphragm spindle encounters the sleeve 36. Since the suction effect of the Venturi tube—in drawing off boiling water—is now insufficient to compress the spring 35 in addition to the spring 34, the lifting stroke of the diaphragm is limited by the contact of the plate 37 with the sleeve 36.

Assuming now the device 15 is now to be set for supplying "hot" but not "boiling" water. In such case a larger amount of water flows per unit of time through the heater and therefore also the Venturi tube. Consequently the Venturi tube exerts a more powerful suction on the pipe 20 and the diaphragm chamber 26 so that the spring 35 also is now compressed to a predetermined extent. Although the cone 30 is consequently lifted further from its seating the cone 29, however, is moved at the same time towards its seating 31. The two valve cones 29, 30 are spaced so that now the valve cone 29 and its seating 31 determine the amount of softening agent supplied. The dimensions may be such that for drawing-off hot water, the aperture provided by the valve cone 29 and its seating is equal to, or smaller than, that provided by the valve cone 30 and its seating in the withdrawal of boiling water. The valve apertures for the time being may also be varied at convenience for example by using interchangeable springs varying the tension of the individual springs or arranging for the valve cones to be relatively adjustable. Another resilient stop may also be provided for limiting the stroke of the diaphragm 27 when hot water is to be withdrawn.

As already mentioned it is usually desirable not to supply the water with any softening agent at all when it is to be heated to only about 40/50° C. Consequently, for the withdrawal of "warm" water the control device must close the passage for the softening agent. This is automatically effected in the same way as the control in the case of withdrawing boiling or hot water. For drawing-off warm water a comparatively large amount of water flows through the heater 10 and Venturi tube 16. Consequently the suction exerted on the diaphragm 27 by the Venturi tube is so powerful that the loading springs are compressed until the valve cone 29 rests on its seating 31. In this position, therefore, no softening agent can be injected.

On the draw-off cock 14 being closed the flow of water through the Venturi tube ceases. The diaphragm 27 is drawn towards the left by the loading spring 34 and thus the valve 30 rests on its seating 32. In this manner the storage vessel 23 is protected from penetration by water under pressure in the pipe 12.

The control device according to the invention also protects the storage vessel 23 from penetration by water when the heater is in operation should an excessive pressure be set up in the heater 10 as the result of partial or complete obstruction of the outlet by dirt or incrustation.

Such pressure if present in the cold water pipe 12 might cause the penetration of water into the pipe 20. However, directly the suction by the Venturi tube ceases the spring 34 moves the valve 30 on to its seating 32. If the increased pressure in the heater is transmitted through the pipe 20 into the diaphragm chamber 26 it also increases the closing pressure of the valve so that the storage vessel is protected against any influx of water.

In the embodiment of the control device shown in Fig. 2, the double-cone valve 29, 30 represented in Fig. 1 is replaced by a slide valve 38 which in the position shown, shuts off the passage for the softening agent. In the case of the dimensions chosen the bores 39, 40 coincide when the diaphragm performs the stroke corresponding with the withdrawal of boiling water, the plate 37 again coming into contact with the sleeve 36. During the further movement of the diaphragm, corresponding to the withdrawal of hot water, the slide valve 38 is moved further towards the right and reduces the aperture of the passage. In this arrangement in order to limit the valve opening movement of the diaphragm an additional spring 41 is provided which the slide valve encounters on reaching the predetermined stroke. The spring 41 is mounted in the screwed cover 42 which is removable for the purpose of inserting the slide valve 38 and can be adjusted to vary the position of the spring 41 by means of the screw formed on said cover. The increased flow of water through the Venturi tube when warm water is to be drawn off pushes the slide valve 38 still further towards the right and thus again closes the passage completely. The movement of the valve towards the left is limited by the contact of a flange 43 with an abutment in the valve casing.

A screw throttle 33, located in the branch connection for the pipe 22 between the control valve 21 and the storage vessel 23 and is adjustable to regulate the maximum supply of softening agent. The setting of the screw is dependent on the local conditions such as the degree of hardness of the water, the length of the pipe connections 20 and 22, the water pressure etc. A detachable filter (not shown) is preferably located at this throttling point.

In the embodiment shown in Fig. 3 the control device 21 is coupled with the draw-off cock 14' serving to control the volume of water flowing through the heater. The control device consists, like that shown in Fig. 1, of a casing with branch connections for the pipes 20 and 22, leading respectively to the Venturi tube 16 and storage vessel 23, and of a cone valve 44 controlling a seating 45. When the cock 14' is in the fully open position shown in Fig. 3 wherein the large amount of water flowing through the heater is heated to about 40–50° C. the valve cone 44 shuts off the supply of softening agent. In order to withdraw "hot" water, the cone 46 of the cock 14' is moved further towards its seating 47, thus throttling the flow. At the same time, through its operative connection with the cock 14' the valve cone 44 of the control valve is lifted from its seating 45, leaving a predetermined aperture for the passage of the softening agent so that the Venturi tube can now draw the latter in. For the withdrawal of "boiling" water the flow of water through the heater is further restricted, the valve cone 44 being thereby moved further away from its seating so that a larger amount of softening agent can now be drawn in. In order to prevent water from passing into the storage vessel 23 when the valve 14' is closed, the valve cone 44 being then furthest away from its seating, said cone 44 is suspended on a diaphragm 48 which, on the cessation of the suction by the Venturi tube 16, is pressed upwards by the pressure created by the water in the supply pipe 12 or in the heater 10, and thus forces the valve cone 44 against its seating. To permit this movement of the diaphragm independently of the setting of the valve 14' the two members, diaphragm 48 and valve 14', are resiliently interconnected by a spring clutch 49. When the valve 14' is closed, the diaphragm 48 can rise in compressing the spring 50. This arrangement also serves to protect the storage vessel 23 when excessive pressure arises in the heater, for example through obstruction of the outlet, when the cock is partially or fully open. Such pressure is transmitted into the suction pipe 20 and raises the diaphragm until the valve 44 rests on its seating 45.

Fig. 4 shows another typical embodiment of the arrangement and design of the control valve. In this figure at a suitable point of the heater 10 there is arranged a thermo-sensitive member 51 influenced by the temperature of the water and adapted to actuate the control valve 52 in the suction pipe 20, 22. The higher the desired and adjustable outflow temperature of the water, the higher will the temperature of the water also be at the point of attachment of the thermo-sensitive member 51. In the drawing, said member is designed as a bellows which expands under the influence of the heat of the water and in so doing moves the valve to a corresponding extent from its seating as the water becomes hotter. In this manner, therefore, the flowing water receives a larger supply of softening agent as its temperature rises. To prevent water from entering the storage vessel 23 a non-return valve 53 is provided in the suction pipe 20, 22 and closes, automatically or under the pressure of the water, when the suction effect of the Venturi tube ceases.

Having now particularly described and ascertained the nature of my said invention and in what manner the same is to be performed, I declare that what I claim is:

1. An apparatus for applying a scale-preventing agent to the water supply of an instantaneous water heater, comprising, in combination, a source of water under pressure, a suction device operated by the water, a suction line connecting said suction device with a source of scale-preventing agent, and valve means controlled by the pressure in said suction line for controlling said suction line whereby the supply of scale-preventing agent to the suction device is increased when the supply of water to the heater is decreased, and the supply of scale-preventing agent to the suction device is decreased when the flow of water to the heater is increased.

2. An apparatus for applying a scale-preventing agent to the water supply of an instantaneous water heater, comprising, in combination, a source of water under pressure, a suction device operated by the water, a suction line connecting said suction device with a source of scale-preventing agent, and valve means controlled by the pressure in said suction line for controlling said suction line, said valve means including a valve which is closed by the negative pressure established in said suction line and a valve which is opened by said negative pressure whereby the supply of scale-preventing agent to the suction device is increased when the supply of water to the heater is decreased, and the supply of scale-preventing agent to the suction device is decreased when the flow of water to the heater is increased.

3. An apparatus for applying a scale-preventing agent to the water supply of an instantaneous water heater, comprising, in combination, a source of water under pressure, a suction device operated by the water, a suction line connecting said suction device with a source of scale-preventing agent, a valve in said suction line which is closed by the negative pressure established in said suction line, and a second valve in said suction line which is closed by positive pressure in said suction line, whereby the flow of scale-preventing agent to the suction device is cut off and the water under pressure is prevented from passing into the source of scale-preventing agent.

4. An apparatus for applying a scale-preventing agent to the water supply of an instantaneous water heater comprising, in combination, a source of water under pressure, a suction device operated by the water, a suction line connecting said suction device with a source of scale-preventing agent, a valve in said suction line which is closed by negative pressure in said suction line and a second valve which is closed by positive pressure in said suction line, both valves forming together a double-cone valve.

5. An apparatus for applying a scale-preventing agent to the water supply of an instantaneous water heater, comprising, in combination, a source of water under pressure, a suction device operated by the water, a suction line connecting said suction device with a source of scale-preventing agent, a valve in said suction line which is operated by the pressure in said suction line, said valve comprising a slide valve having a passage which is closed by positive pressure in the suction line as well as by a negative pressure therein which exceeds a predetermined value.

6. An apparatus for applying a scale-preventing agent to the water supply of an instantaneous water heater, comprising, in combination, a source of water under pressure, a suction device operated by the water, a suction line connecting said suction device with a source of scale-preventing agent, a valve in said suction line which is operated by the pressure in said suction line, and a series of springs, said valve being loaded by said springs which come successively into operation whenever the stroke of the valve attains a predetermined value.

7. An apparatus for applying a scale-preventing agent to the water supply of an instantaneous water heater, comprising, in combination, a source of water under pressure, a suction device operated by the water, a suction line connecting said suction device with a source of scale-preventing agent, a device regulating the quantity of water flowing through the water heater, and a valve in said suction line operable by the pressure therein and which is operatively coupled with said device.

8. An apparatus for applying a scale-preventing agent to the water supply of an instantaneous water heater, comprising, in combination, a source of water under pressure, a suction device operated by the water, a suction line connecting said suction device with a source of scale-preventing agent, and a valve in said suction line operable by the pressure therein, a device regulating the quantity of water flowing through the water heater, and a spring clutch operatively coupling said valve with said device.

9. An apparatus for applying a scale-preventing agent to the water supply of a water heater, comprising in combination, a source of water under pressure, a suction device operated by the flow of water to said heater and having a conduit opening into the path of said water, a suction line connecting said suction device with a source of scale-preventing agent, and means controlled by the pressure in said suction line for controlling said suction line whereby the supply of scale-preventing agent to said suction device is increased when the supply of water to the heater is decreased and the supply of scale-preventing agent to the suction device is decreased when the flow of water to the heater is increased.

10. An apparatus for applying a scale-preventing agent to the water supply of a water heater, comprising, in combination, a source of water under pressure connected to said heater, a source of scale-preventing agent connected to said water source, and means controlled by the flow of water to said heater for supplying scale-preventing agent to the water flowing to said heater in inverse proportion to the intensity of said flow.

GEORG HEGWEIN.